Aug. 23, 1949.  G. SCHENKEL  2,480,052
COMBINED FILTER NETWORK AND ELECTROMECHANICAL TRANSDUCER
Filed July 16, 1946
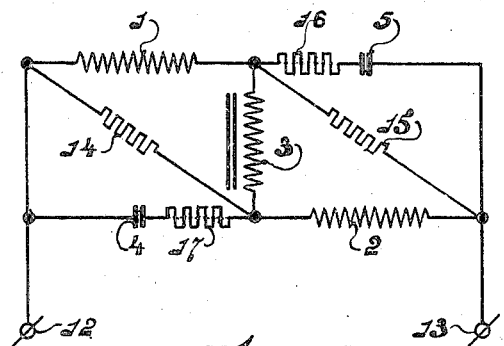
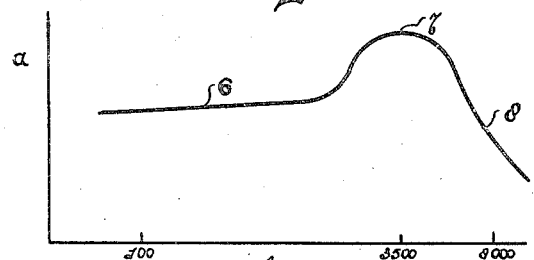
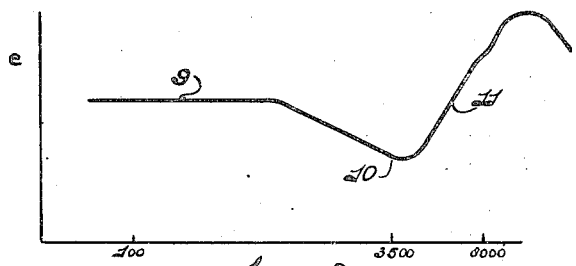
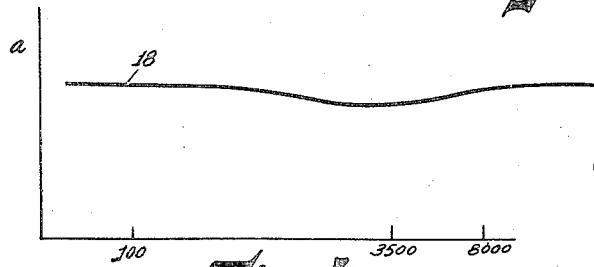
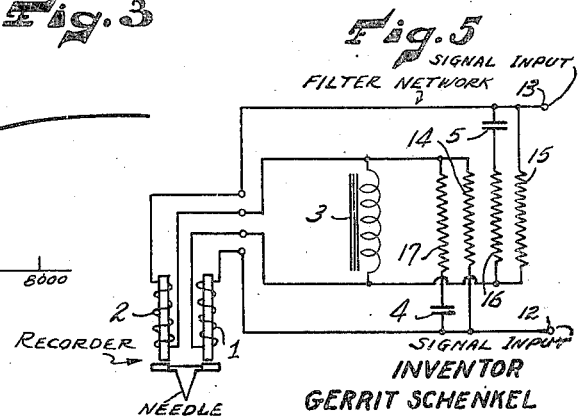
INVENTOR
GERRIT SCHENKEL
BY
ATTORNEY.

Patented Aug. 23, 1949

2,480,052

UNITED STATES PATENT OFFICE 2,480,052

COMBINED FILTER NETWORK AND ELECTROMECHANICAL TRANSDUCER

Gerrit Schenkel, Eindhoven, Netherlands, assignor to Hartford National Bank and Trust Company, Hartford, Conn., as trustee Application July 16, 1946, Serial No. 684,083
In the Netherlands February 3, 1943

Section 1, Public Law 690, August 8, 1946
Patent expires February 3, 1963

7 Claims. (Cl. 179—100.4)

This invention relates to an electro-mechanical transformation system, for example an electro-magnetic recorder for the recording of acoustic oscillations. In a device of this kind the characteristic curve of the recorder exhibits a peak at comparatively high frequencies, for example at about 3500 cycles/sec., as a result of resonance of the mechanical part of the system, said peak changing into a portion of the characteristic which declines comparatively steeply in the range of still higher frequencies, for example higher than about 5000 cycles/sec. Consequently, the amplitudes of the acoustic oscillations recorded in the example chosen are too large at 3500 cycles/sec. and too small above 5000 cycles/sec.

Now, the invention has for its purpose to correct as far as possible those portions occurring in definite frequency ranges which differ comparatively strongly from the straight characteristic desired in the ideal case of electro-mechanical transformation systems.

According to the invention, to this end an electro-mechanical transformation system comprises two transducer driving coils connected in series to the source of supply and separated by an inductance, the series-connection of the first coil with the inductance as well as that of the second coil with the inductance each being shunted by a condenser, whilst the inductance and the condensers are given such values that in the vicinity or substantially in the vicinity of the mechanical resonance frequency of the system each of the condensers connected in series with the inductance is separately in resonance with the latter. This implies that the voltage at the coils, since each of them is shunted by the series-connection of the inductance and a condenser, attains a minimum at the resonance frequency. Since this resonance frequency has been given a value equal or substantially equal to that of the mechanical resonance frequency of the system, that is to say the frequency at the place of the peak in the characteristic above referred to, a complete or partial suppression of this peak and hence a flatter characteristic curve is obtained.

An additional improvement in this respect, more particularly in the steeply declining portion of the characteristic is obtained when according to another feature of the invention the value of the inductance relatively to that of the impedance of the coils is in addition chosen such that the voltage set up at the coils is a maximum at frequencies, preferably in the vicinity of or above the highest frequencies located in the said steeply declining portion. The amplitude of the frequencies occurring in the region is thus enlarged, so that in the case of a device for the recording of sound an improvement in the recording of higher tones is obtained.

It is still mentioned that with the arrangement of the parts of the transformation system according to the invention one obtains on principle a series-connection of the two coils at low frequencies but a parallel connected at high frequencies, which can be deduced immediately from the circuit diagram shown in Figure 1. From this ensues that the impedance which exists at terminals 12 and 13 at high frequencies is lower than that at low frequencies, at which the coils are in series. Since this decrease of impedance, already taken place in a frequency range corresponding to the frequency range wherein the said steeply declining portion of the characteristic is located, more current traverses the coils in this portion even with constant voltage at the terminals 12 and 13, so that also more energy is taken up. This results in a compensating influence on the said steeply declining portion whilst in addition the capacity of the amplifier which serves for the supply of the system according to the invention and which in the case of an ordinary transmission system having a single coil supplies a much smaller amount of energy at high frequencies as a result of the high impedance than at low frequencies (lower impedance of the coil) comes to better advantage.

In order that the invention may be more clearly understood and readily carried into effect it will be described more fully by reference to some figures shown diagrammatically in the accompanying drawing.

In the drawing:

Fig. 1 is a schematic diagram of a filter network in accordance with the invention, Figs. 2, 3 and 4 are characteristic curves explanatory of the theory underlying the operation of the network in Fig. 1, and Fig. 5 is a schematic diagram of the filter network acting in conjunction with an electromechanical recorder.

In Figure 1, which shows diagrammatically one embodiment of the invention, two transducer driving coils 1 and 2 according to the invention are connected in series with the interposition of an inductance 3. The series-connection of coil 1 and inductance 3 as well as that of coil 2 and inductance 3 are each shunted by a condenser 4 and 5 respectively. The inductance 3 and each of the condensers 4 and 5 are given such values that each of the condensers 4 and 5 is in resonance with the inductance 3 at a frequency equal or substantially equal to the mechanical resonance frequency of the system.

Figure 2 shows a characteristic curve 6 of a known recorder for the cutting of records, which represents the function between the velocity amplitude of the needle-point and the frequency at constant voltage between the terminals of the recorder without filter. As a consequence of the resonance of the mechanic part of the system which in the present instance is chosen at about 3500 cycles/sec. to obtain a sufficient sensitivity and a serviceable extensiveness of the frequency range to be recorded, the characteristic curve in this region exhibits a peak 7 which steeply declines at 8 in the higher frequency range. The present invention has for its purpose to give this characteristic a flatter variation.

Figure 3 shows a characteristic curve 9 of the filter circuit shown in Figure 1, which represents the relation which exists between the voltage at one of coils 1 and 2 and the frequency. The dale 10 in the characteristic 9 is obtained by giving each of the condensers and the inductance such values that for a frequency of about 3500 cycles/sec. resonance occurs in the series-connection of 3 and 4 on the one hand and of 3 and 5 on the other hand. At 3500 cycles/sec. the voltage set up at each of these series-connections and consequently at each of the coils 1 and 2 is thus a minimum. The steep portion 11 of this characteristic is due to the fact that the inductance 3 relatively to the impedance of the coils 1 and 2 is in addition so proportioned that the voltage set up at the coils exhibits a maximum at the highest frequencies which occur in the steep portion 8 of Figure 2. The high voltage set up at coils 1 and 2 is represented by the rising branch 11.

The resistances 14, 15, 16 and 17 shown in addition in Figure 1 serve as damping resistances. The result of the whole filter diagram of Figure 1 is shown in Figure 3.

From Figure 2 and Figure 3 ensues a characteristic curve 18 shown in Figure 4, which is considerably improved relatively to that of Figure 2. The improvement obtained will be evident immediately. In practice the electrical values of the parts of the diagram shown in Figure 1 were as follows:

1 and 2 each about 300 ohms at 10,000 cycles/sec., 3 about 18 mh, 4 and 5 each 0.1 microfarad, 14 and 15 each 820 ohms and at last 16 and 17 each 40 ohms.

Referring now to Fig. 5, the filter network of Fig. 1 is illustrated as it operates in conjunction with a transducer in the form of an electromechanical recorder for cutting records. The recorder is provided with two driving coils 1 and 2, which are equivalent to the correspondingly numbered coils in Fig. 1, the coils being arranged to actuate a record cutting needle. The recorder possesses a frequency-vs.-needle point velocity characteristic wherein a mechanical resonance velocity peak is exhibited at a definite frequency, as shown for example in Fig. 2. The filter elements, as pointed out in connection with Fig. 1 modify the characteristic curve of the recorder so that a substantially flat frequency response is realized.

What I claim is:

1. In combination an electromechanical transducer having a driven member and first and second driving coils and a frequency-vs.-response characteristic curve wherein a mechanical resonance response peak is exhibited at a definite frequency, and a filter network comprising an inductive element having a given reactive value and interconnecting said coils in a series circuit, means for applying an energizing signal potential across said series circuit, and a pair of capacitative elements having given reactive values, one of said capacitative elements being coupled in shunt relation with the series-connected first coil and inductive element, the other of said capacitative elements being coupled in shunt relation with the series-connected second coil and inductive element, said capacitive elements and said inductive element possessing respective values at which in the vicinity of the mechanical resonance frequency of said transducer each of said capacitive elements is separately in series-resonance relation with said inductive element.

2. In combination an electromechanical transducer having a driven member and first and second driving coils and a frequency-vs.-response characteristic curve wherein a mechanical resonance response peak is exhibited at a definite frequency and wherein a relatively sharp decline in response is exhibited in the frequency region following said definite frequency, and a filter network comprising an inductive element having a given reactive value and interconnecting said coils in a series circuit, means for applying an energizing signal potential across said series circuit, and a pair of capacitative elements having given reactive values, one of said capacitative elements being coupled in shunt relation with the series-connected first coil and inductive element, the other of said capacitative elements being coupled in shunt relation with the series-connected second coil and inductive element, said capacitive elements and said inductive element possessing respective values at which in the vicinity of the mechanical resonance frequency of said transducer each of said capacitive elements is separately in series-resonance relation with said inductive element, the value of said inductive element relative to the impedance of said coils being such that the voltage developed across said coils is at maximum level in the frequency region located in the sharply declining portion of the frequency-vs.-response characteristic of said transducer.

3. In combination an electromechanical transducer having a driven member and first and second driving coils and a frequency-vs.-response characteristic curve wherein a mechanical resonance response peak is exhibited at a definite frequency and wherein a relatively sharp decline in response is exhibited in the frequency region following said definite frequency, and a filter network comprising an inductor having a given reactive value and interconnecting said coils in a series circuit, means to apply an energizing signal potential across said series circuit, a pair of capacitors having given reactive valves, and a pair of resistors, one of said capacitors being connected serially with one of said resistors across the series-connected first coil and inductor, the other of said capacitors being connected serially with the other of said resistors across the series-connected second coil and inductor, said capacitors and said inductor possessing respective values at which in the vicinity of the mechanical resonance frequency of said transducer, each of said capacitors is separately in series-resonance relation with said inductor, the value of said inductor relative to the impedance of said coils being such that the voltage developed across said coils is at maximum level in the frequency region located in the sharply declining portion of the frequency-vs.-response characteristic of said transducer.

4. In combination an electromechanical transducer having a driven member and first and second driving coils and a frequency-vs.-response characteristic curve wherein a mechanical resonance response peak is exhibited at a definite frequency and wherein a relatively sharp decline in response is exhibited in the frequency region following said definite frequency, and a filter network comprising an inductor having a given reactive value and interconnecting said coils in a series circuit, means for applying a source of energizing signal potential across said series circuit, a pair of capacitors having given reactive values, a first pair of resistors, one of said capacitors being connected serially with one of said resistors of said first pair across the series-connected first coil and inductor, the other of said capacitors being connected serially with the other of said resistors of said first pair across the series-connected second coil and inductor, and a second pair of resistors, one of said resistors in said second pair being connected across the series-connected first coil and inductor, the other of said resistors in said second pair being connected across the series-connected second coil and inductor, said capacitors and said inductor possessing respective values at which in the vicinity of the mechanical resonance frequency of said transducer, each of said capacitors is separately in series-resonance relation with said inductor, the value of said inductor relative to the impedance of said coils being such that the voltage developed across said coils is at maximum level in the frequency region located in the sharply declining portion of the frequency-vs.-response characteristic of said transducer.

5. In combination an electromechanical recorder having first and second driving coils, a record cutting needle and a frequency-vs.-needle point velocity characteristic curve wherein a mechanical resonance velocity peak is exhibited at a definite frequency and a filter network comprising an inductive element having a given reactive value and interconnecting said coils in a series circuit, means for applying an energizing signal potential across said series circuit, and a pair of capacitative elements having given reactive values, one of said capacitative elements being coupled in shunt relation with the series-connected first coil and inductive element, the other of said capacitative elements being coupled in shunt relation with the series-connected second coil and inductive element, said capacitive elements and said inductive element possessing respective values at which in the vicinity of the definite frequency of said characteristic curve, each of said capacitive elements is separately in series-resonance relation with said inductive element.

6. In combination an electromechanical recorder having first and second driving coils, a record cutting needle and a frequency-vs.-needle point velocity characteristic curve wherein a mechanical resonance velocity peak is exhibited at a definite frequency and wherein a relatively sharp decline in velocity is exhibited in the frequency region following said definite frequency, and a filter network comprising an inductive element having a given reactive value and interconnecting said coils in a series circuit, means for applying an energizing signal potential across said series circuit, and a pair of capacitative elements having given reactive values, one of said capacitative elements being coupled in shunt relation with the series-connected first coil and inductive element, the other of said capacitative elements being coupled in shunt relation with the series-connected second coil and inductive element, said capacitive elements and said inductive element possessing values at which in the vicinity of the definite frequency of said recorder curve, each of said capacitive elements is separately in series-resonance relation with said inductive element, the value of said inductive element relative to the impedance of said coils being such that the voltage developed across said coils is at a maximum level in the frequency region located in the sharply declining frequency-vs.-needle point velocity characteristic of said recorder.

7. In combination an electromechanical recorder having first and second driving coils, a record cutting needle and a frequency-vs.-needle point velocity characteristic curve wherein a mechanical resonance velocity peak is exhibited at a definite frequency and wherein a relatively sharp decline in velocity is exhibited in the frequency region following said definite frequency, and a filter network comprising an inductor having a given reactive value and interconnecting said coils in a series circuit, means for applying a source of energizing signal potential across said series circuit, a pair of capacitors having given reactive values, a first pair of resistors, one of said capacitors being connected serially with one of said resistors of said first pair across the series-connected first coil and inductor, the other of said capacitors being connected serially with the other of said resistors of said first pair across the series-connected second coil and inductor, and a second pair of resistors, one of said resistors in said second pair being connected across the series-connected first coil and inductor, the other of said resistors in said second pair being connected across the series-connected second coil and inductor, said capacitors and said inductor possessing respective values at which in the vicinity of the definite frequency of said recorder curve each of said capacitors is separately in series-resonance relation with said inductor, the value of said inductor relative to the impedance of said coils being such that the voltage developed across said coils is at maximum level in the frequency region located in the sharply declining portion of the frequency-vs.-needle point velocity characteristic of said recorder.

GERRIT SCHENKEL.

REFERENCES CITED

The following references are of record in the file of this patent:

UNITED STATES PATENTS

| Number | Name | Date |
|---|---|---|
| 1,792,859 | Mitchell | Feb. 17, 1931 |
| 1,870,778 | Lang | Aug. 9, 1932 |
| 2,212,389 | Chorpening | Aug. 20, 1940 |
| 2,218,399 | Le Bel | Oct. 15, 1940 |
| 2,251,300 | Star | Aug. 5, 1941 |
| 2,285,079 | Behre | June 2, 1942 |

OTHER REFERENCES

"Transmission Circuit for Telephonic Communication," by K. S. Johnson, 1924, Western Electric Company, pages 174–179.